United States Patent Office 3,138,580
Patented June 23, 1964

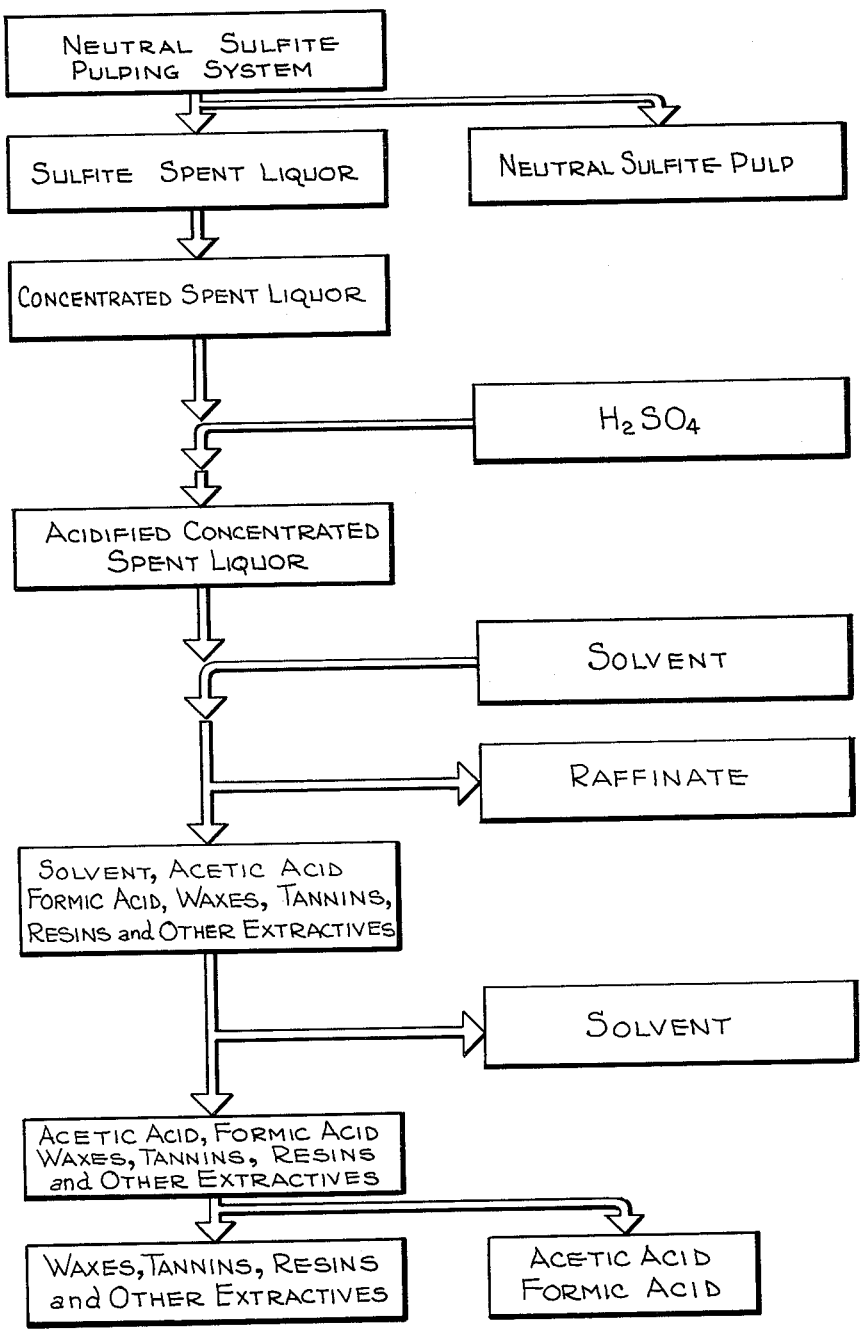

3,138,580
PROCESS FOR RECOVERY OF FAT-RESIN
CONSTITUENTS FROM BLACK LIQUOR
William H. Baxley, William A. Biggs, Jr., William R. Cook, and John T. Wise, Hartsville, S.C., assignors to Sonoco Products Company, Hartsville, S.C., a corporation of South Carolina
Filed Nov. 25, 1960, Ser. No. 71,574
5 Claims. (Cl. 260—97)

This invention relates to the recovery of valuable constituents from the black liquor obtained during a wood pulping process and more particularly to the recovery of the fat-resin constituents from the black liquor produced in the pulping of hardwoods by the neutral sulfite semi-chemical pulping process.

It is well known that the liquid material commonly referred to as "black liquor" obtained during a pulping process carried out in the production of paper pulp contains valuable constituents among which are included fats and resins. In the kraft or sulfate process generally used in the pulping of soft-woods, the fat-resin constituents recovered from the kraft black liquor is generally referred to as "tall oil." Tall oil, in the form of its sodium salt, is present in the kraft black liquor which is drawn from the digesters and stores in tanks. A material, which is lighter than water, containing this tall oil rises to the surface of the tank where it is skimmed off. These skimmings are acidified with sulfuric acid to liberate the resinous and fatty acids from their sodium salts and crude tall oil is floated off the top of the aqueous sulfuric acid layer.

The fat-resin constituents of the black liquor produced during pulping of hardwoods by the sulfite process are somewhat related to the fat-resin constituents of the kraft black liquor, but are chemicaly different and it is not possible to recover the sulfite fat-resin constituents by the process used on the kraft black liquor. The fats-resins mixture in the sulfite black liquor is highly emulsified in a highly stable, colloidal system with the lignin sulfonates and will not separate at any dilution on standing, either hot or cold, after acidification.

Accordingly, a primary object of this invention is to provide a new and novel process for recovering valuable constituents in black liquor produced in a pulping operation.

Another object of this invention is to provide a new and novel process for extracting the fat-resin constituents from black liquor produced during the sulfite pulping of hardwoods.

A further object of this invention is to provide a new and novel process for extracting a material from hardwood sulfite black liquor which is capable of being employed for a wide variety of end uses either in the crude form or in a refined form.

Other objects and advantages of the invention will become apparent from the following description taken in connection with the accompanying flow sheet.

The objects stated above and other related objects of this invention are accomplished by the provision of a new and novel process for treating hardwood black liquor produced by a neutral sulfite semi-chemical pulping operation which includes acidifying the black liquor to liberate acids contained therein, contacting the acidified black liquor with a solvent to remove the acids together with waxes, tannins, resins and other extractives and subsequently removing the acids and solvent to recover the valuable waxes, tannins, resins and other extractives.

The accompanying drawing illustrates the process of the present invention in flow diagram form, the ingredients involved being labeled in this flow diagram.

The black liquor resulting from the pulping of hardwood by the neutral sulfite semi-chemical process is generally known to be composed of sodium lignin sulfonate, sodium acetate, sodium formate, calcium oxalate, pentose sugars, hexose sugars, fatty acids and esters, resins, and fatty alcohols. The fat and resin constituents of the black liquor appear to be commercially valuable for a number of uses. For instance, the fat-resin constituents appear to be suitable for use (1) as additives in the compounding of rubber; (2) in laminating materials; (3) as an adhesive base; (4) as a paper size; (5) in surfactant and detergent manufacture; (6) as edible fats; (7) in the manufacture of alkyd resins; (8) in oil well drilling muds; (9) in ore flotation; (10) as an insecticide and defoliant and (11) as foam generators. With the use of the novel process of this invention, these fats-resins constituents can be recovered in usable form and can be used for the purposes above and others either in a crude form or a refined form.

As generally illustrative of the invention, the black liquor effluent from the neutral sulfite semi-chemical pulping operation is first concentrated to approximately 20% to 75% solids by means of evaporators of any suitable design. The concentrated black liquor is then acidified with a strong mineral acid such as sulfuric acid to liberate the saponified fatty acids which include acetic and formic acids.

The acidified black liquor is then contacted with a solvent for the fats and resins to remove the acetic acid, formic acid, waxes, tannins, resins and other extractives.

The extracting solvent may be any solvent or solvent mixture which is suitable for obtaining the results desired in the process of the invention. It is highly desirable that the solvent chosen be of the type which prevents emulsion formation in the concentrated acidified black liquor and which has a high partition coefficient for the acetic and formic acids and the fat-resin extractives in the liquor. The solvent selected should be one which will extract the waxes, tannins and resins simultaneously and methyl ethyl ketone (2-butanone) is a highly efficient solvent for accomplishing these desired results.

While methyl ethyl ketone is the desired solvent for use in the practice of the invention, it should be understood that other solvents or solvent mixtures may be used such as ethyl acetate, benzol, ethylene dichloride, diethyl Cellosolve, cyclo-hexanone, 70% isopropyl acetate and 30% isopropanol, 75% n-propyl acetate and 25% n-propanol, 75% n-propyl acetate and 25% acetone, tertiary butyl alcohol, various combinations of aliphatic esters with aliphatic alcohol, etc. Contacting the acidified black liquor with the solvent may be carried out in any conventional solids-handling countercurrent extraction equipment.

After the extraction step, the extracted mixture containing the acids, waxes, tannins, resins, etc., is separated from the raffinate and is run through a solvent recovery column in which the solvent is removed. In the preferred operation, the solvent is recovered overhead in the recovery column and the acid with the fats-resins mixture is taken out at the bottom of the column.

The acid and fats-resins mixture is then conducted through a vaporizer so that the volatile acetic and formic acids are flashed off and recovered. The solids or fats-resins mixture is discharged from the bottom of the vaporizer.

The small amount of acetic and formic acids remaining in the fats-resins mixture subsequent to the vaporization step may be removed from the fats-resins mixture by subjecting the mixture to live steam in a stripper column and the acids thus stripped out from the mixture can be recovered in a condenser. The fats-resins mixture may then be utilized in the desired manner as a crude product without further treatment and the uses to which this mixture may be put have been referred to above.

The fat-resin solids mixture may be further refined by breaking down and isolating the various constituents in the fats and resins. This refining step can be carried out by any suitable conventional process such as vacuum distillation, selective solvent extraction, or by chemical means. By way of illustration as to the chemical nature of this fats-resins mixture, a chemical analysis of a fats-resins mixture produced by the practice of the invention using black liquor resulting from the pulping of black gum, tupelo gum, sweet gum, yellow poplar and red maple reveals that such a mixture has constituents identified qualitatively as the following:

| | |
|---|---|
| Syringic acid | Capric acid |
| Vanillic acid | $C_{18}$ to $C_{29}$ acids |
| p-Hydroxybenzoic acid | Sterols |
| Succinic acid | Vanillin |
| Oleic acid, | Acetovanillone |
| Palmitic acid | Syringaldehyde |
| Myristic acid | Acetosyringone |
| Lauric acid | Lactic acid |
| Cinnamic acid | Succinic acid |

The following is an illustrative but non-limiting example of the process of this invention. Black liquor from hardwoods pulped by the neutral sulfite semi-chemical process is concentrated to 45% solids content in an evaporator. The concentrated black liquor is acidified with 66° Baumé (95%) sulfuric acid using 20 parts of sulfuric acid to 100 parts of black liquor solids. The concentrated acidified black liquor is introduced into the top of a column countercurrent extractor and one and one-half volumes of methyl ethyl ketone-water binary azeotrope is introduced at the bottom of the extractor. The extract, containing acids, waxes, oils, etc., is run through a solvent recovery column with the water binary azeotrope of the methyl ethyl ketone being distilled off overhead and condensed for reuse. The acid-fats-resins solids residue is taken off at the bottom of the column. This acid-resin-fat mixture is then conducted through a flash vaporizer wherein the acetic and formic acids are flashed off, condensed and recovered. The waxes and resins are then placed near the top of a stripper column and a live steam blast is introduced at the bottom of the column to strip out the remaining acetic and formic acids which are recovered in a condenser and the valuable fat-resin solids mixture is recovered as a crude product. The crude fat-resin mixture may be utilized as such or further refined into a variety of fats and resins by any suitable refining process such as vacuum distillation, selective solvent extraction, chemical means or the like.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A method of recovering the fat-resin constituents from black liquor resulting from the pulping of hardwoods by the neutral sulfite semi-chemical process comprising acidifying the black liquor with sulfuric acid to liberate saponified fatty acids, contacting the acidified black liquor with a fat and resin solvent selected from a class consisting of benzol, ethylene dichloride and diethyl Cellosolve to produce a solvent-acids-fats-resins mixture, removing the solvent from said mixture, removing the acetic and formic acids from said mixture and recovering the fats and resins in said mixture.

2. A method of recovering the fats-resins constituents from black liquor with sulfuric acid resulting from the pulping of hardwoods by the neutral sulfite semi-chemical process comprising concentrating said black liquor to a solids content of approximately 25% to 60%, acidifying the concentrated black liquor with sulfuric acid to liberate saponified fatty acids, contacting the concentrated and acidified black liquor with a fat and resin solvent selected from a class consisting of benzol, ethylene dichloride and diethyl Cellosolve to produce a solvent-acids-fats-resins mixture, removing the solvent from said mixture, removing the acids from said mixture and recovering the fats and resins in said mixture.

3. A method of recovering the fats-resins constituents from black liquor resulting from the pulping of hardwoods by the neutral sulfite semi-chemical process, comprising concentrating the black liquor to a solids content of approximately 25% to 60%, acidifying the concentrated black liquor with sulfuric acid to liberate saponified fatty acids, contacting the concentrated and acidified black liquor with a fat and resin solvent selected from a class consisting of benzol, ethylene dichloride and diethyl Cellosolve, distilling off the solvent, flashing off a portion of the acids, steam distilling to remove additional acids and recovering the fats-resins solids mixture.

4. A method in accordance with claim 3 including the step of fractionating the fats-resins solids mixture into a variety of refined fats and resins by vacuum distillation.

5. A method in accordance with claim 3 including the step of fractionating the fats-resins solids mixture into a variety of refined fats and resins by selective solvent extraction.

References Cited in the file of this patent

UNITED STATES PATENTS

| | | |
|---|---|---|
| 2,360,862 | Morris et al. | Oct. 24, 1944 |
| 2,575,013 | Hasselstrom et al. | Nov. 13, 1951 |
| 2,801,264 | Thomsen | July 30, 1957 |